US006658457B2

(12) United States Patent
Nishikawa et al.

(10) Patent No.: US 6,658,457 B2
(45) Date of Patent: *Dec. 2, 2003

(54) DEVICE AND METHOD FOR INTERCONNECTING DISTANT NETWORKS THROUGH DYNAMICALLY ALLOCATED BANDWIDTH

(75) Inventors: Hiroshi Nishikawa, Kawasaki (JP); Hideyuki Motoyama, Kawasaki (JP); Ayako Suzuki, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 21 days.

(21) Appl. No.: 09/442,883

(22) Filed: Nov. 18, 1999

(65) Prior Publication Data

US 2003/0187934 A1 Oct. 2, 2003

(30) Foreign Application Priority Data

Mar. 19, 1999 (JP) ............................................. 11-074806

(51) Int. Cl.[7] ............................................. H04L 12/28
(52) U.S. Cl. ..................... 709/206; 709/227; 709/228; 370/223
(58) Field of Search ................................. 709/206, 217, 709/222, 224, 225, 227, 228, 230; 370/223, 230, 468

(56) References Cited

U.S. PATENT DOCUMENTS

| 4,775,973 | A | 10/1988 | Tomberlin et al. ........... 709/203 |
| 5,432,783 | A | 7/1995 | Ahmed et al. ................. 370/17 |
| 5,506,834 | A | 4/1996 | Sekihata et al. .............. 370/60 |

(List continued on next page.)

FOREIGN PATENT DOCUMENTS

| EP | 0 448 073 | 9/1991 |
| EP | 0 689 309 | 12/1995 |
| JP | 57-007505 A | 1/1982 |

(List continued on next page.)

OTHER PUBLICATIONS

"Dynamic Packet Transport Technology and Applications Overview", XP–002143361; 1999; pp. 1–17.
"Real–Time Bandwidth Allocation and Path Restorations in Sonet–Based Self Healing Mesh Networks" Gersht, et al., Proceedings of the International Conference on Communications, Geneva; May 23–26, 1993 vol. 3, ISBN: 0–7803–0950–2; XP010136903; pp. 250–255.
"A Current Bellcore View of Sonet ATM VP Rings" Sosnosky, et al., Global Telecommunications Conference, 1995 Nov. 1995: ISBN: 0–7803–2509–5: XP010164308, pp. 39–44.

*Primary Examiner*—Ayaz Sheikh
*Assistant Examiner*—Khanh Quang Dinh
(74) *Attorney, Agent, or Firm*—Katten Muchin Zavis Rosenman

(57) ABSTRACT

An internetworking device and method which interconnects distant networks through an intermediary transport network, employing a bandwidth allocating mechanism to enable efficient and transparent LAN-to-LAN communication. A network interface unit provides communication interface functions to link with each network to be connected. Data traffic between the networks is observed by a traffic monitor and reported to a bandwidth allocation controller. A bandwidth resource database stores information on the usage of bandwidth resources. When a certain node in one network attempts to send data packets toward the other network, the bandwidth allocation controller dynamically allocates sufficient bandwidth resources to the requested connection, based on the reported data traffic and the information stored in the bandwidth resource database. With the allocated bandwidth, packets are transported to the destination under the control of a communication controller.

16 Claims, 17 Drawing Sheets

U.S. PATENT DOCUMENTS

| | | | |
|---|---|---|---|
| 5,588,003 A | 12/1996 | Ohba et al. | 370/468 |
| 5,815,490 A * | 9/1998 | Lu | 370/223 |
| 5,867,482 A | 2/1999 | Kobayashi | 370/60.1 |
| 6,118,791 A * | 9/2000 | Fichou et al. | 370/468 |
| 6,137,777 A * | 10/2000 | Vaid et al. | 370/230 |
| 6,292,465 B1 * | 9/2001 | Vaid et al. | 370/230 |
| 6,292,475 B1 * | 9/2001 | Swail | 709/222 |

FOREIGN PATENT DOCUMENTS

| | | |
|---|---|---|
| JP | 63-107249 A | 5/1988 |
| JP | 05-153154 A | 6/1993 |
| JP | 05-153154 | 6/1993 |
| JP | 07-154430 A | 6/1995 |
| JP | 08-288180 A | 11/1996 |
| JP | 09-200228 | 7/1997 |
| JP | 09-200228 A | 7/1997 |
| JP | 10-322377 | 12/1998 |
| JP | 10-322377 A | 12/1998 |
| WO | 92/21185 | 11/1992 |

\* cited by examiner

DEVICE AND METHOD FOR INTERCONNECTING DISTANT NETWORKS THROUGH DYNAMICALLY ALLOCATED BANDWIDTH

BACKGROUND OF THE INVENTION

1. Field of the Invention

The present invention relates to an internetworking device and method, and more particularly to an internetworking device and method for interconnecting distant networks through dynamically allocated bandwidth resources on a transport network.

2. Description of the Related Art

In recent years, 100 Mbps data transmission technologies (e.g., 100BASE-T Ethernet) are gaining popularity in the field of local area networks (LANs), and the increased LAN speeds make it practical to deliver bandwidth-intensive multimedia data including video and voice information, in addition to transporting computer files. At the same time, the recent advancement of high-performance personal computers (PCs) has enabled general users to enjoy high-speed computing with extremely powerful CPUs and rich memory resources. In the above circumstances, new network applications such as teleconferencing and distance learning have become a reality, taking advantage of LAN interconnect services bridging two or more remote locations. Another typical case of internetworking is an enterprise network system which interconnects distant branch offices and factories by using ISDN services or leased lines. In this system, routers, bridges, or other internetworking devices are used to convert LAN's physical interface and protocols to those used in an existing telecommunications network, such as 64 Kbps ISDN services.

The above system is, however, unable to provide transparent communication between two distant LANs, because the high bitrate of 100BASE-T LANs has to be reduced eventually to 64 Kbps of the ISDN transport network when one LAN user attempts to communicate with a remote party. That is, the performance of conventional LAN-to-LAN communication is limited by a fixed bandwidth of the transport network being used. Since LAN data traffic is often bursty, the use of a low-speed transport link would result in reduced service quality, including intolerable delay in data delivery. Overwhelming amounts of data bursts could cause buffer overflow, and resultant communication errors would produce additional network traffic for data retransmission.

The above problems of a slow transport network can be solved by employing a leased line with a higher bandwidth, which will enable bursty file transfer traffic to be smoothly transported to the destination network. However, reserving a dedicated high-speed channel to cope with bursty traffic is a costly and inefficient solution, because average LAN traffic is much lower in general than the traffic during peak load conditions.

Meanwhile, asynchronous transmission mode (ATM) technologies may be applied to the transport network interconnecting distant LAN environments. This ATM-based internetworking system, however, may not necessarily be efficient in terms of bandwidth utilization, since ATM cells must carry relatively large overhead information compared to their payload, and adaptation to LAN interface requires another kind of overhead to be added. The network bandwidth consumed by such overhead information cannot be neglected.

As mentioned earlier, existing telecommunications services are normally used to interconnect remote networks and build a wide area network (WAN) environment. However, data communication interfaces provided by such existing services often use complex protocols and need complicated configuration setups, thus imposing more management workloads on the users. That is, the users have to operate and maintain the WAN interface in addition to LANs they are using.

SUMMARY OF THE INVENTION

Taking the above into consideration, an object of the present invention is to provide an internetworking device which integrates a LAN interface and an efficient bandwidth allocating mechanism to enable transparent LAN-to-LAN communication.

To accomplish the above object, according to the present invention, there is provided an internetworking device which interconnects at least two distant networks through a transport network. This internetworking device comprises the following elements:

(a) a network interface unit which provides a communication interface to link with each of the networks;

(b) a traffic monitor which monitors data traffic between the networks;

(c) a bandwidth resource database which stores information on bandwidth resources;

(d) a bandwidth allocation controller which dynamically allocates a bandwidth resource(s) sufficient to transport data streams over the transport network, considering the data traffic being monitored by the traffic monitoring unit, as well as consulting the bandwidth resource database; and (e) a communication controller which controls data transport between the networks through the allocated bandwidth resources.

Another object of the present invention is to provide an internetworking method which employs a more efficient bandwidth allocation algorithm to enable transparent LAN-to-LAN communication.

To accomplish the second object, according to the present invention, there is provided an internetworking method to allow at least two distant networks to communicate through a transport network. This method, comprises the following steps:

(a) providing a communication interface to link with each of the networks;

(b) monitoring data traffic between the networks;

(c) providing a database storing information on bandwidth resources;

(d) dynamically allocating a bandwidth resource sufficient to transport data streams over the transport network, based on the data traffic being monitored and consulting the database; and (e) controlling data transport between the networks through the allocated bandwidth resources.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
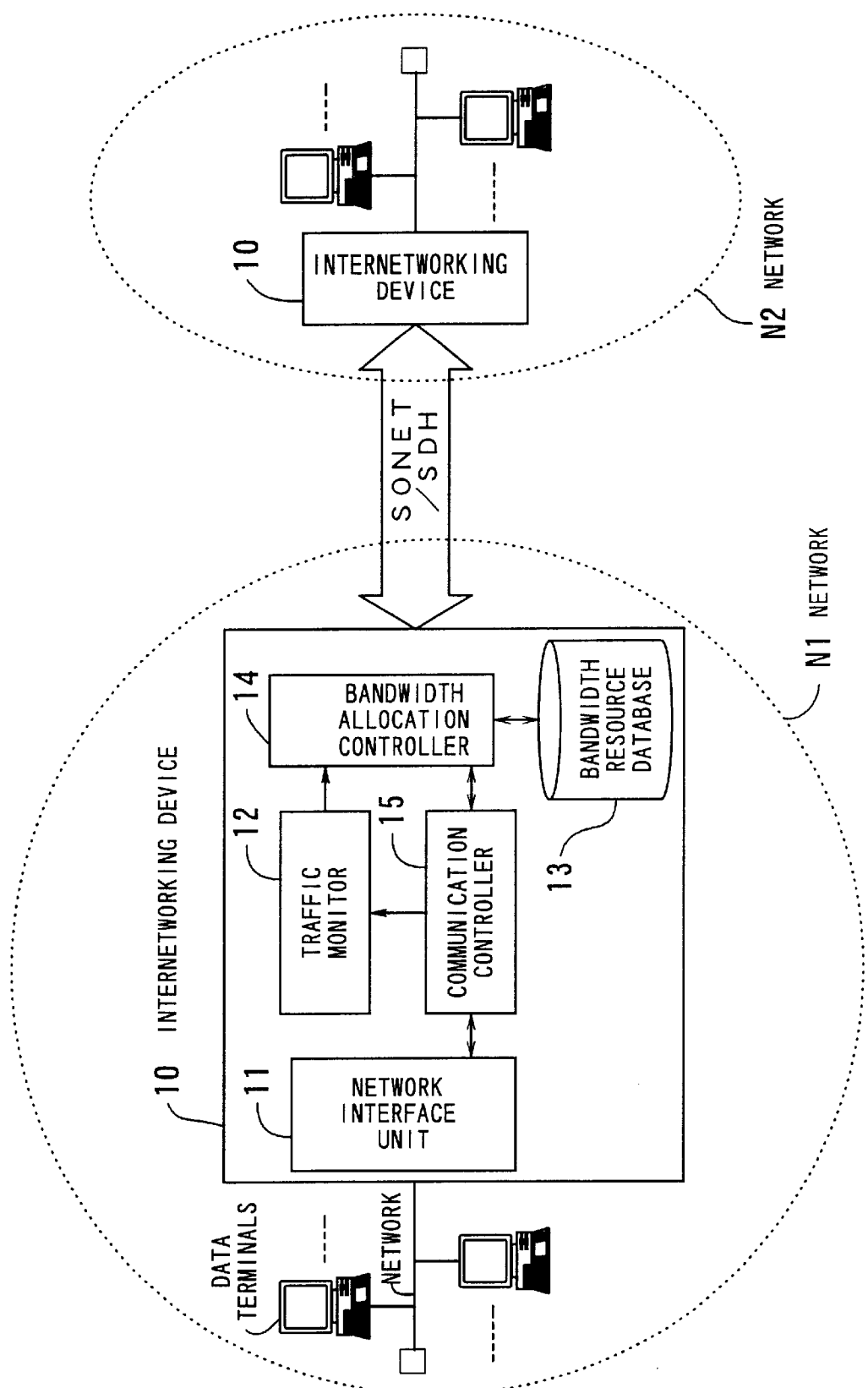
FIG. 1 is a conceptual view of an internetworking device according to the present invention.

FIG. 1 is a conceptual view of an internetworking device 10 according to the present invention. This proposed internetworking device 10 is used to interconnect two distant networks N1 and N2 via an intermediary transport network such as SONET/SDH backbones. Actually, the system needs two internetworking devices 10, one for each end network, N1 and N2, to provide SONET/SDH interface functions. The SONET/SDH interface is often configured to have dual redundant transmission paths, one for active use and the other for backup purposes. Here, SONET (Synchronous Optical Network) is a U.S. standard system, while SDH (Synchronous Digital Hierarchy) is an international standard adopted by the ITU-T. Acknowledged as today's key multiplexing technologies, SONET and SDH are closely related to each other, and thus the term "SDH" will hereafter be used to refer collectively to SONET and SDH systems.

Each internetworking device 10 comprises the following functional blocks: a network interface unit 11, traffic monitor 12, a bandwidth resource database 13, a bandwidth allocation controller 14, and a communication controller 15. One internetworking device 10 shown on the left-hand side of FIG. 1 serves the network N1 through a network interface unit 11. This network interface unit 11 provides communication interface functions required to link with the network N1, including layer-1 electrical and physical interfaces compatible with a LAN transmission medium configured in a bus topology as illustrated in FIG. 1. Working together with other components described later, the network interface unit 11 plays an intermediary role between LAN and SDH, which use different protocols. The traffic monitor 12 watches data traffic over the network N1, particularly messages and data streams destined for the remote network N2. Details of this traffic monitoring function will be discussed later.

The bandwidth resource database 13 stores and manages several kinds of information necessary for allocating bandwidth. They are: what types of bandwidth resources and how many such channels the system owns, whether the system supports redundancy or not, what bandwidth allocation is currently used, etc. The bandwidth resource database 13 updates such records, keeping track of changes in the bandwidth allocation, or as instructed by users.

When a certain node in the network N1 has data packets destined for the other network N2, the bandwidth allocation controller 14 dynamically allocates a necessary bandwidth to the requested connection, based on the current status of network traffic and bandwidth resources, as well as referring to control parameters given by the users. To this end, the bandwidth allocation controller 14 is designed to interact and negotiate with the bandwidth resource database 13 automatically. Bandwidth allocation tasks are performed in an adaptive manner, without depending on the bitrates of individual networks or the fixed bandwidth definitions of existing digital hierarchies (i.e., SONET/SDH) governing the transport network. More specific examples of this bandwidth allocation will be presented later.

The communication controller 15 controls data transport over an SDH channel allocated to interconnect the two networks N1 and N2. In each network N1 and N2, one data terminal is assigned as a management console, with which an operator can configure, monitor, and maintain the internetworking device 10 at each end.

As described above, the proposed internetworking device 10 is designed to dynamically allocate an appropriate bandwidth for internetworking purposes, based on the information on network traffic and available bandwidth resources. Recall that conventional internetworking devices are restricted in their transmission bandwidth choices. According to a typical digital hierarchy, the lowest bitrate is 64 kbps, and faster channels are provided only in a stepwise manner, e.g., 1.5 Mbps, 6.3 Mbps, 50 Mbps, and so on. It is not allowed to provide an intermediate bandwidth of, for example, 20 Mbps between 6.3 Mbps and 50 Mbps. The present invention solves this bandwidth limitation problem by employing a dynamic and flexible mechanism for bandwidth allocation, making efficient and economical use of available network resources. As a result, users can enjoy transparent communication with remote parties, without concern for the presence of an intermediary transport network.

Figure 2:
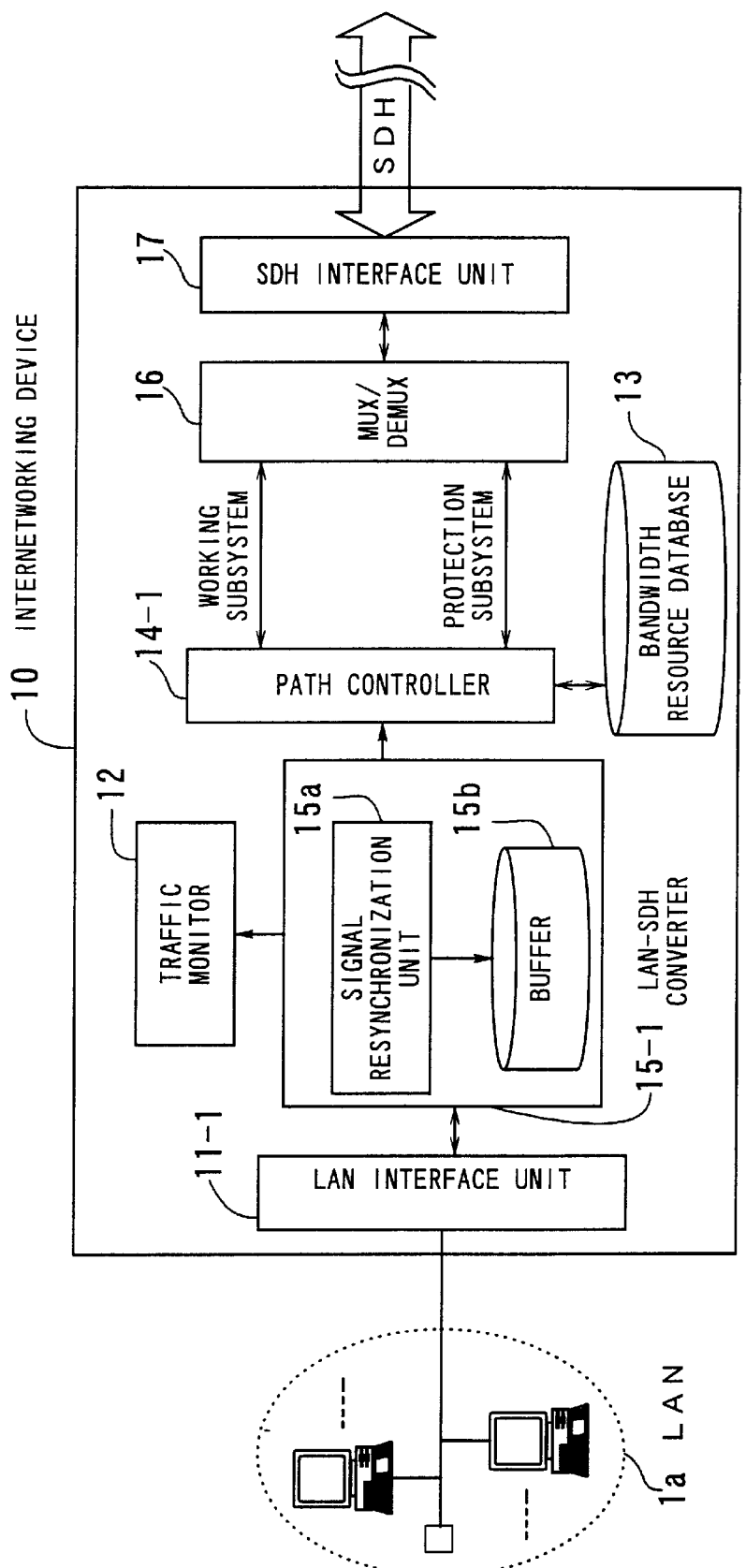
FIG. 2 is a diagram which shows a more specific structure of the proposed internetworking device.

Referring now to FIG. 2, the next section will present a more specific configuration of the internetworking device 10 of the present invention. It is assumed here that the internetworking device 10 interconnects two local area networks (LANS) over an SDH transmission line, while only one end network 1a is shown in FIG. 2. Note that the network interface unit 11, bandwidth allocation controller 14, and communication controller 15 explained in FIG. 1 are implemented as a LAN interface unit 11-1, path controller 14-1, and LAN-SDH converter 15-1, respectively. The internetworking device 10 shown in FIG. 2 further comprises a multiplexer/demultiplexer 16 and an SDH interface unit 17. The functions of these elements will be defined below.

The LAN interface unit 11-1 provides interface functions to link with a user network, LAN 1a. Outgoing messages sent from the LAN 1a are supplied to the LAN-SDH converter 15-1 through the LAN interface unit 11-1 and then converted to fit the SDH transmission speeds. The LAN-SDH converter 15-1 also converts incoming messages received over the SDH transmission line so as to make them fit the transmission rate of the LAN 1a, before passing them to the LAN interface unit 11-1. This LAN-SDH converter 15-1 comprises a signal resynchronization unit 15a and a buffer 15b. The signal resynchronization unit 15a changes signal timings when sending a message from LAN to SDH or vise versa; that is, it resynchronizes the transmission signals with the destination's clock signal. The buffer 15b serves as temporary storage for the resynchronized signals, smoothing out excessive traffic to a certain extent.

The traffic monitor 12 watches the traffic on the LAN 1a. The multiplexer/demultiplexer (mux/demux) 16 inserts or consolidates signals received from the path controller 14-1 into an SDH signal stream. It also demultiplexes the signals received over an SDH network to drop data signals addressed to the LAN 1a. The SDH interface unit 17 permits the internetworking device 10 to link with an SDH network.

When routing data messages from the LAN 1a to the SDH network, the path controller 14-1 reads out resynchronized data signals from the buffer 15b and then sends their copies to dual redundant transmission subsystems; one is called "working subsystem" (or "active subsystem") and the other is "protection subsystem" (or "backup subsystem"). This duplex system provides fault tolerance, or survivability, to the network system, since, in case of a failure in the working subsystem, it can instantly switch to the protection subsystem and continue the operations. Hereafter, signal paths on the working and protection subsystems will be called "working paths" and "protection paths," respectively. Also, bandwidth resources available on the working and protection subsystems will be termed "working (bandwidth) resources" and "protection (bandwidth) resources," respectively.

Referring again to FIG. 2, the path controller 14-1 allocates a bandwidth by choosing an appropriate path(s), considering the total user bandwidth prescribed in the contract, as well as estimating actual data traffic. The user may specify a desired bandwidth for the LAN interconnect service, in which case the specified bandwidth parameters are stored in the bandwidth resource database 13. The path controller 14-1 chooses an appropriate bandwidth by combining, if necessary, several existing SDH channels having different bitrates (e.g., 1.5 Mbps, 6.3 Mbps, 50 Mbps, 150 Mbps, etc.), so that it will meet the requirement of average LAN-to-LAN traffic or the bandwidth specified by the user. The outgoing data signals are supplied to the multiplexer/demultiplexer 16, which laces the signals to the allocated path(s).

On the other hand, when receiving data from the SDH network to the LAN 1a, the path controller 14-1 first determines which transmission subsystem to use, working subsystem or protection subsystem. If the working subsystem has no problem, the path controller 14-1 chooses it to receive data from the multiplexer/demultiplexer 16. The path controller 14-1 would change the selection from working to protection, in the event that the SDH interface unit 17 detects an anomaly in the working transmission subsystem. The received data is then passed to the LAN-SDH converter 15-1, which resynchronizes it to fit the transmission clock of the LAN 1a. The data is then sent to the LAN interface unit 11-1 through the buffer 15b, thereby delivering the received data messages to their destination(s) on the LAN 1a.

Figure 3:
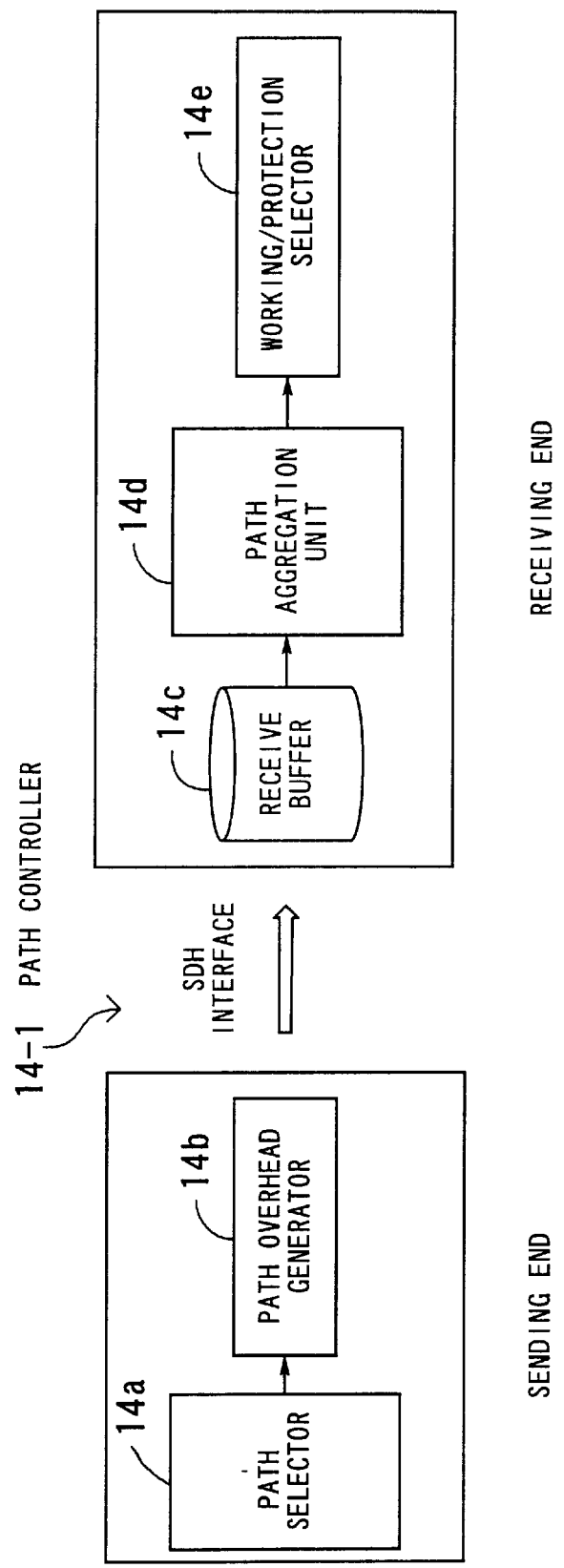
FIG. 3 is a diagram which shows the structure of a path controller.

Referring next to FIG. 3, the structure of the path controller 14-1 will be described below. FIG. 3 shows the main functional blocks of the path controller 14-1, separately at the sending end and receiving end. It should be appreciated that all those functional blocks are actually disposed at both ends to support bidirectional communication.

The blocks working at the sending end include a path selector 14a and a path overhead generator 14b. The path selector 14a selects one or more paths to reserve a bandwidth that is sufficient to convey specific data streams within a reasonable time frame. This operation is referred to as "dynamic bandwidth allocation." In actuality, the path selector 14a may choose one high-speed path or a plurality of paths having uniform or non-uniform bandwidth specifications. Further, it may combine various paths to reserve a necessary and sufficient bandwidth. When using two or more paths for data transmission, the path selector 14a appropriately segments each data message to a plurality of blocks and distributes them through the paths, as will be described later. The path overhead generator 14b then adds overhead information to the outgoing signal on each path.

On the other hand, the function blocks working at the receiving end include a receive buffer 14c, a path aggregation unit 14d, and a working/protection selector 14e. The receive buffer 14c adjusts the phase of the received SDH signals by temporarily storing them to compensate for possible phase lags. This phase-compensated signals are then fed to the path aggregation unit 14d, which reconstructs the original data message from the received multiple-segmented data signals, as well as removing overhead information from them. The working/protection selector 14e chooses either of the working subsystem or protection subsystem to receive messages.

Figure 4:
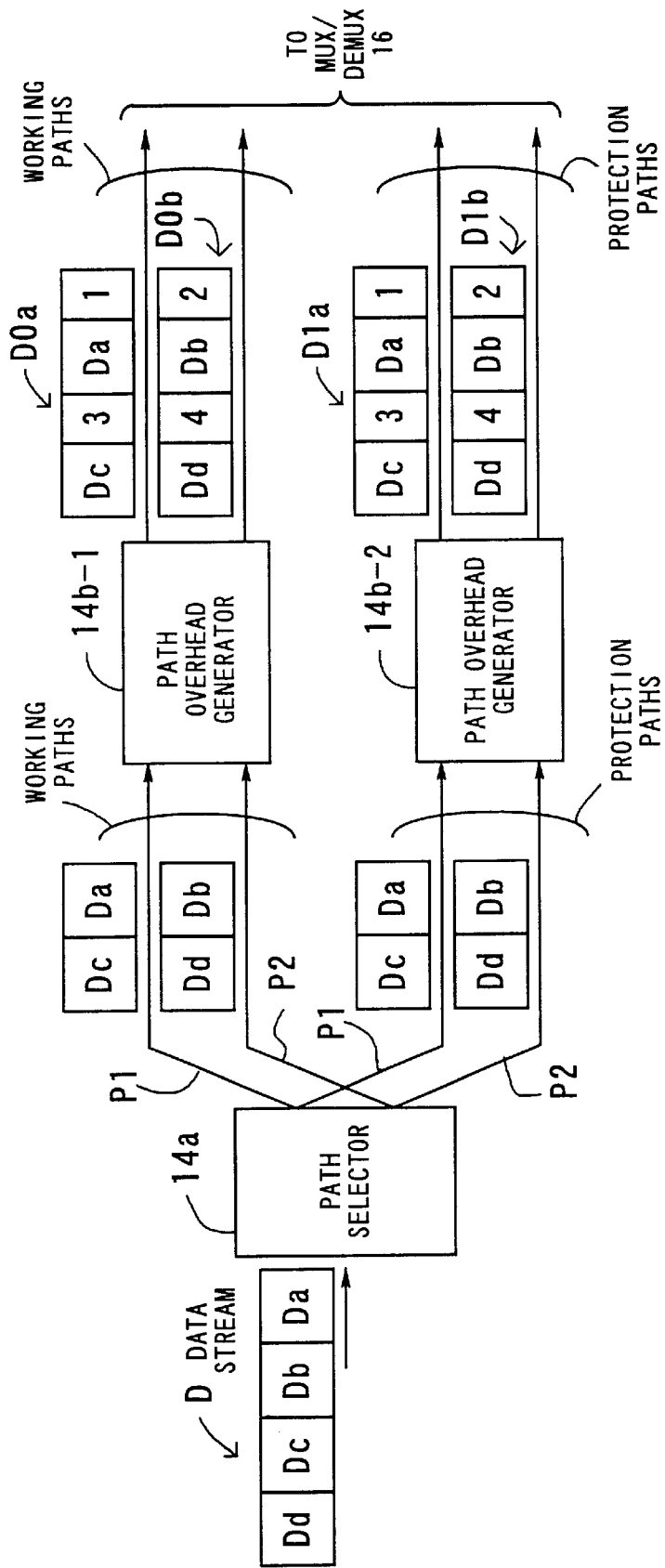
FIG. 4 is a diagram which shows how the internetworking device at the sending end uses allocated paths to transport data.
Figure 5:
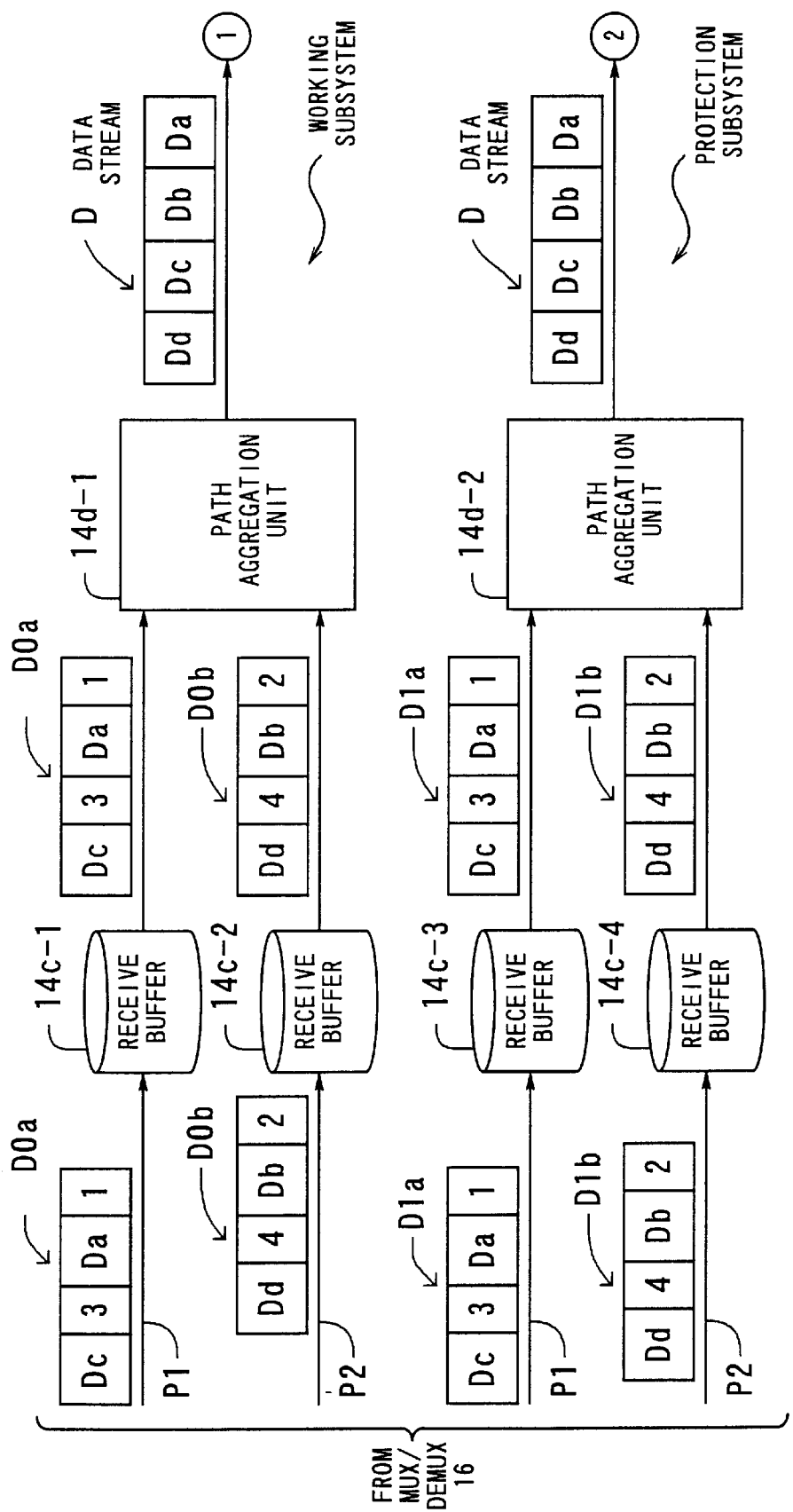
FIGS. 5 and 6 are diagrams which show how the internetworking device at the receiving end uses allocated paths to receive data.
Figure 6:
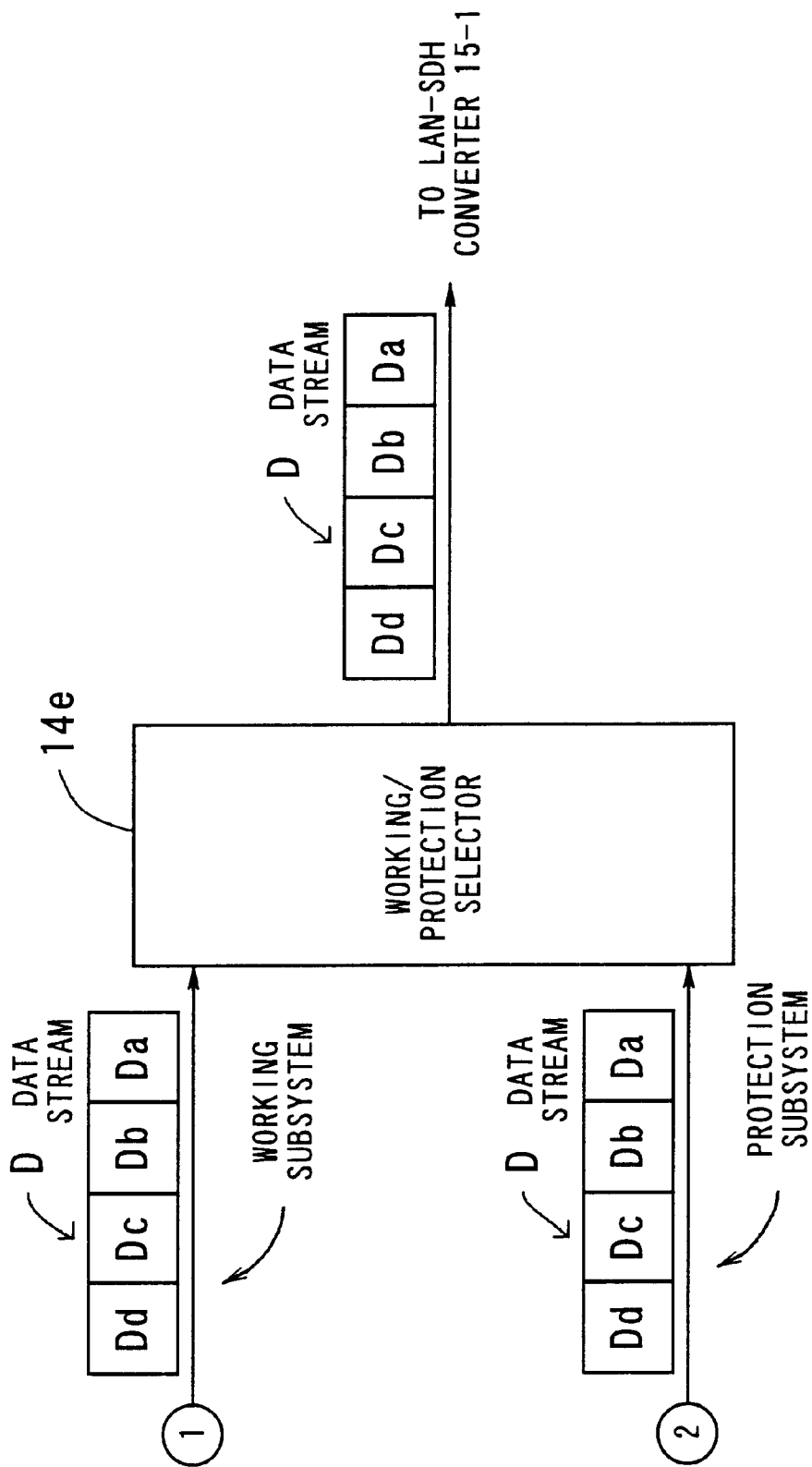

Referring now to FIGS. 4 to 6, the next section will explain how the path controller 14-1 dynamically allocates a bandwidth to LAN interconnect services by combining a plurality of bandwidth resources.

FIG. 4 shows the operation of the path controller 14-1 located at the sending end. When a data stream D is given, the path selector 14a first chooses one or more appropriate paths to provide a sufficient bandwidth for transmission of the outgoing data stream D, considering the expected traffic and consulting the bandwidth resource database 13 to know what bandwidth resources are available or allowed by the user. Suppose, for example, that any available single path cannot provide the required bandwidth, and thus the path selector 14a has chosen two paths P1 and P2 having equal or unequal bandwidths. As FIG. 4 shows, the outgoing data stream D consists of four data blocks (Da, Db, Dc, Dd). The path selector 14a then divides them into two segments (Da, Dc) and (Db, Dd) and distributes these segments to the paths P1 and P2, respectively. Because the system supports a dual redundant transmission scheme, the above message should be placed not only on the working paths, but also on the protection paths. That is, every data directed to the working subsystem has to be duplicated for transmission over the protection paths.

The data streams segmented and duplicated as such are then subjected to path overhead generators 14b-1 and 14b-2, where overhead information is added to indicate the order of data blocks. FIG. 4 shows this overhead information in a simple box preceding each outgoing data block. More specifically, the path overhead generator 14b-1 on the working paths adds overhead information "1" to the first data block Da, and similarly, "2," "3," and "4" to the other data blocks Db, Dc, and Dd, respectively. The path overhead generator 14b-2 on the protection paths does the same for the duplicated data blocks.

It should be noted that the use of multiple transmission paths would introduce some signal skew, because the signals may travel along different routes before reaching the same destination. The developed signal skew would lead to improper ordering of received data blocks, resulting in an error detected at the receiving end. To avoid such errors, the path overhead generators 14b-1 and 14b-2 provide each data block with overhead information that indicates a proper block sequence. The resultant data streams D0a and D0b (working) and D1a and D1b (protection) are supplied to the multiplexer/demultiplexer 16, which inserts them into an SDH bitstream, separately for each of the working and protection subsystems.

FIGS. 5 and 6 show how the path controller 14-1 at the receiving end uses the allocated bandwidth resources to receive incoming data streams. The multiplexer/demultiplexer 16 (not shown in FIG. 5) outputs data streams D0a and D0b sent over the working paths, together with D1a and D1b sent over the protection paths. Four separate receive buffers 14c-1 to 14c-4 are employed to buffer the received data streams. As noted in the previous paragraph, incoming data streams may have different delays depending on how they were routed. The receive buffers 14c-1 to 14c-4 compensate for such signal skews by referring to overhead information, thus outputting data blocks in the correct phase alignment.

According to overhead information of each data block, path aggregation units 14d-1 and 14d-2 reconstruct the original data stream D from the in-phase data streams D0a, D0b, D1a, and D1b. Now that two identical data streams are reproduced independently by the working and protection subsystems, the working/protection selector 14e chooses the output of the working subsystem in normal situations. If the working subsystem has any problem, it chooses the output of the protection subsystem. The data stream D selected as such is then supplied to the LAN-SDH converter 15-1.

As described above, the proposed internetworking device 10 is designed to interconnect LANs by dynamically allocating appropriate bandwidth resources according to increase and decrease in LAN traffic. This feature of the present invention permits two distant LAN environments to communicate transparently, without suffering degradation in the network performance.

Figure 7:
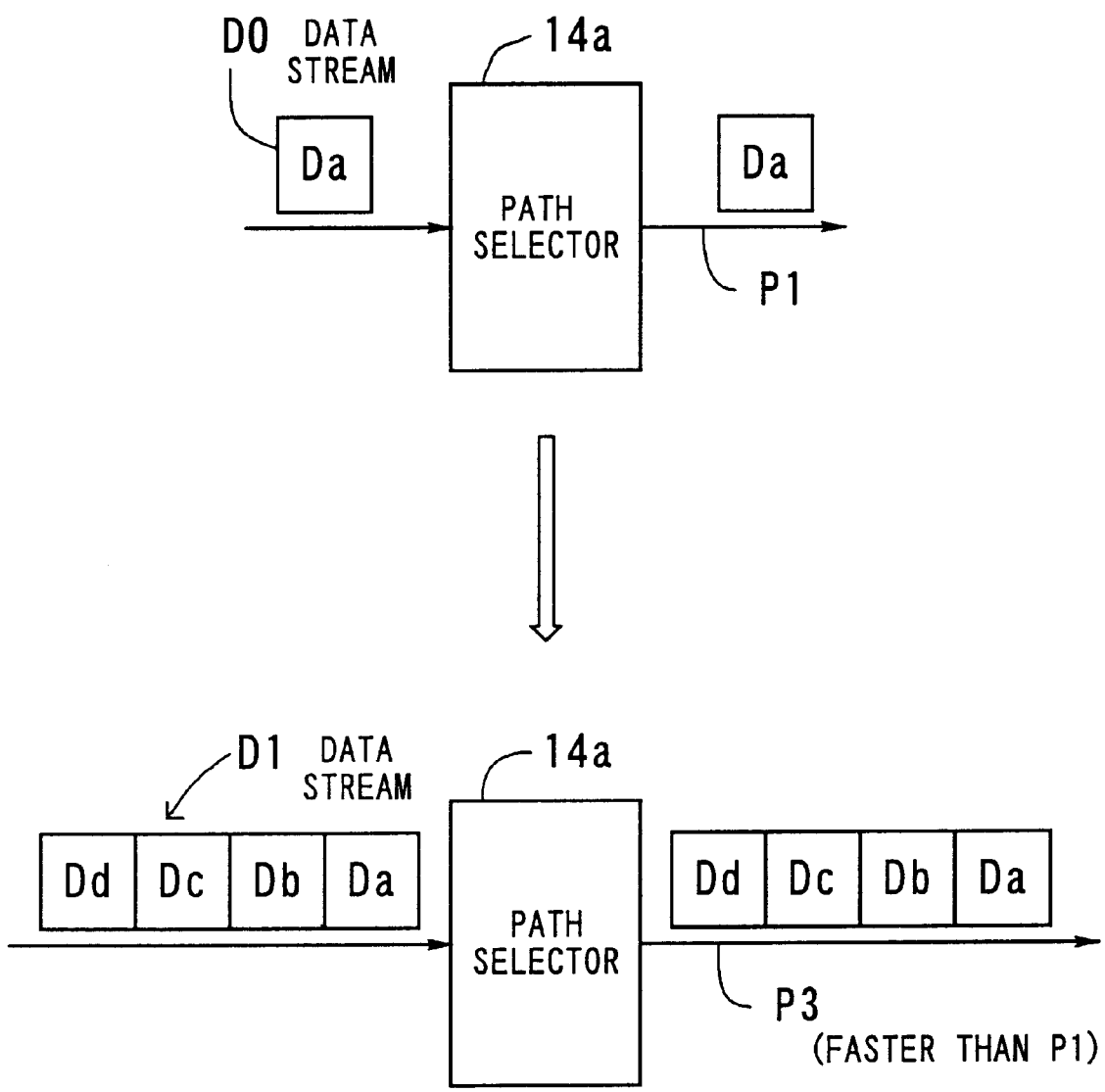
FIG. 7 is a diagram which shows how to allocate an additional bandwidth at the sending end.
Figure 8:
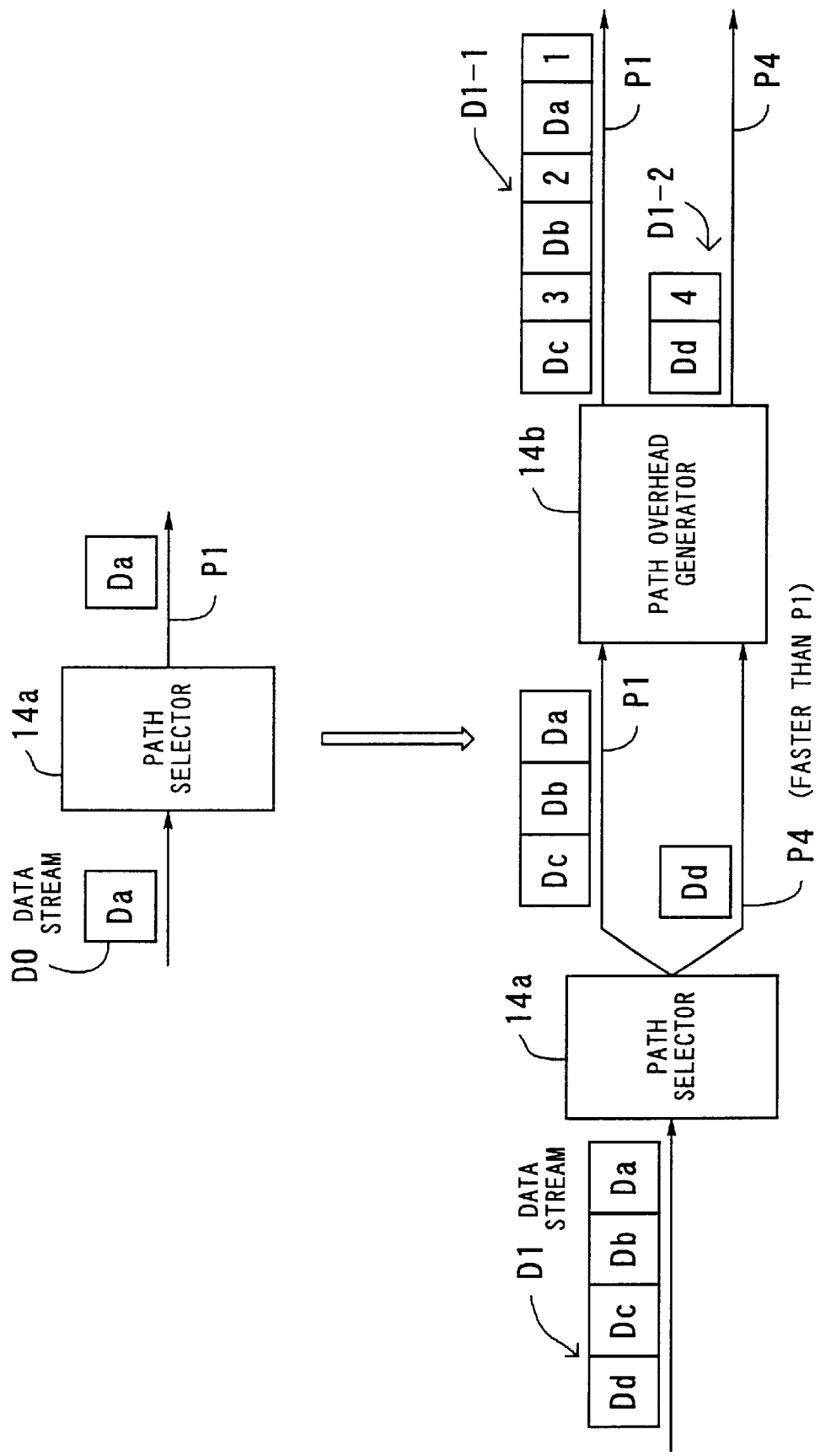
FIG. 8 is another diagram which shows how to allocate an additional bandwidth at the sending end.

Referring next to FIGS. 7 and 8, the following section will explain how the path controller 14-1 dynamically allocates a higher bandwidth to LAN interconnect services.

FIGS. 7 and 8 illustrate the operation at the sending end (for simplicity, only the working subsystem is shown). It is assumed here that the path selector 14a initially uses a single path P1 for LAN-to-LAN connection, as shown in the upper halves of FIGS. 7 and 8. While this path P1 provides a moderate bandwidth enough to handle low data traffic D0, it is not sufficient for a subsequent data stream D1 having a larger volume. To cope with the increased traffic, the path selector 14a attempts to enhance the bandwidth, consulting the bandwidth resource database 13 to know what resources are available or allowed by the user.

One way of raising the bandwidth is to switch the path to a faster one. Referring to the lower half of FIG. 7, the path selector 14a releases the present path P1 and chooses a new path P3 having a higher bandwidth. The data stream D1 is transported to the destination via the newly allocated high-bandwidth path P3.

Another way of raising the bandwidth is to allocate a new path in addition to the existing path P1. Referring to the lower half of FIG. 8, the path selector 14a allocates a second path P4, which may have a higher bandwidth. The given data stream D1 is divided into blocks and distributed to the two paths P1 and P4. FIG. 8 shows an example situation where data blocks Da, Db, and Dc are directed to the first path P1 and Dd to the second path P4. The path overhead generator 14b adds overhead information to each data block as follows: "1" to Da, "2" to Db, "3" to Dc, and "4" to Dd. The two resultant data streams D1-1 and D1-2 with overhead information are then passed to the multiplexer/demultiplexer 16. At the receiving end, these two streams are recombined by the path aggregation unit 14d as described earlier (see FIGS. 5 and 6 for details).

As described above, the proposed internetworking device 10 is designed to dynamically allocate a higher bandwidth to cope with increased traffic in LAN-to-LAN communication, by switching the path to a faster one or allocating an additional path(s) in parallel with the present path(s). This feature of the present invention permits two distant LAN environments to communicate transparently, without suffering degradation in the network performance.

Figure 9:
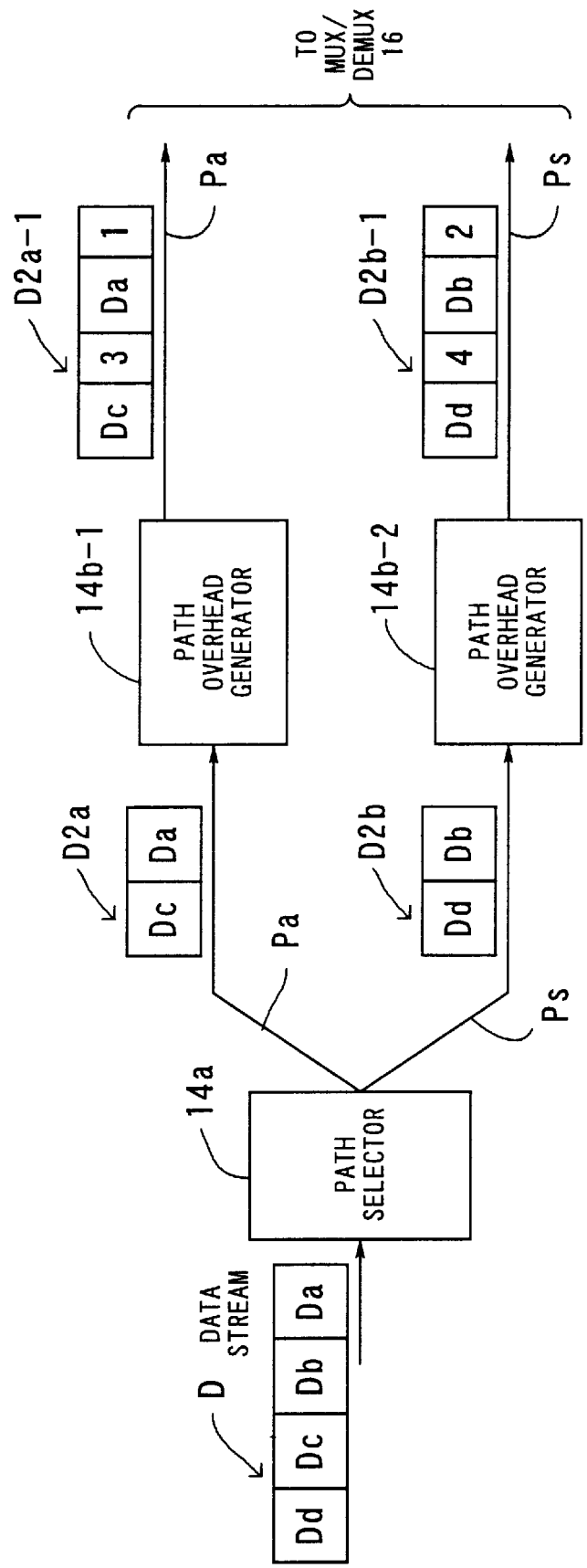
FIG. 9 is a diagram which shows how the internetworking device at the sending end allocates protection resources to increase the bandwidth.

The present invention proposes still another method of bandwidth allocation, which assigns a protection subsystem as part of bandwidth resources. FIG. 9 shows the operation of a path controller 14-1 disposed at the sending end. As in the implementations described earlier, the path selector 14a chooses one or more paths, considering the expected traffic and consulting the bandwidth resource database 13 to know what bandwidth resources are available or allowed by the user. However, the path selector 14a shown in FIG. 9 choose both a working path Pa and a protection path Ps to provide a sufficient bandwidth for transmission of an outgoing data stream D. Data blocks constituting the stream D are distributed to those two path Pa and Ps. More specifically, the path selector 14a directs data blocks Da and Dc to the working path Pa, and Db and Dd to the protection path Ps. Note that no data duplication takes place in this case, since the dual redundant transmission facilities are temporarily invalidated. The path overhead generators 14b-1 and 14b-2 add overhead information to the data blocks to indicate their sequence as follows: "1" to Da, "2" to Db, "3" to Dc, and "4" to Dd. The two resultant data streams D2a-1 and D2b-1 with overhead information are then passed to the multiplexer/demultiplexer 16.

Figure 10:
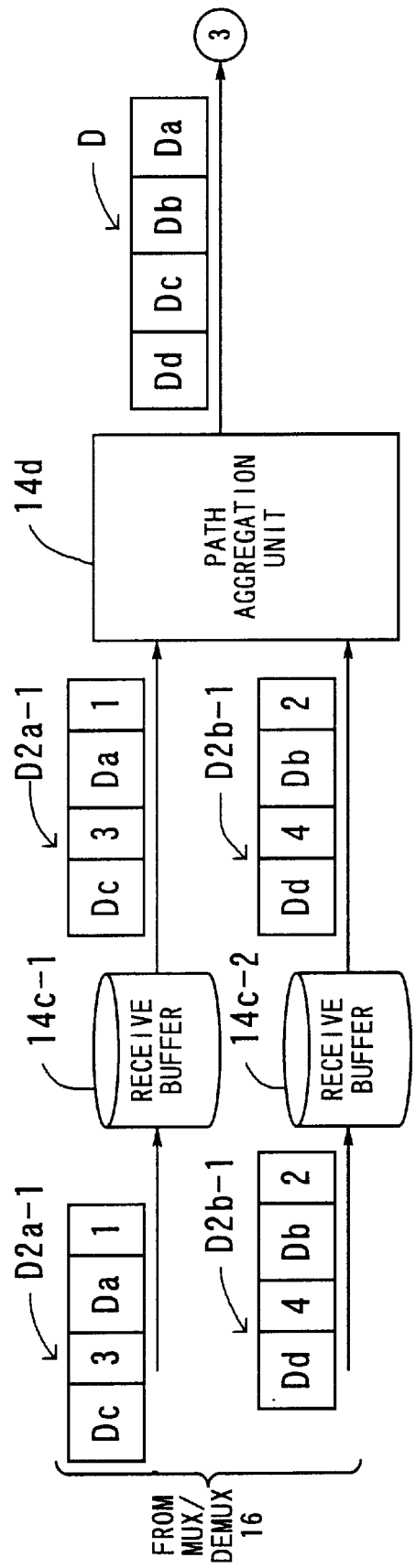
FIGS. 10 and 11 are diagrams which show how the internetworking device at the receiving end uses protection resources to receive data.
Figure 11:
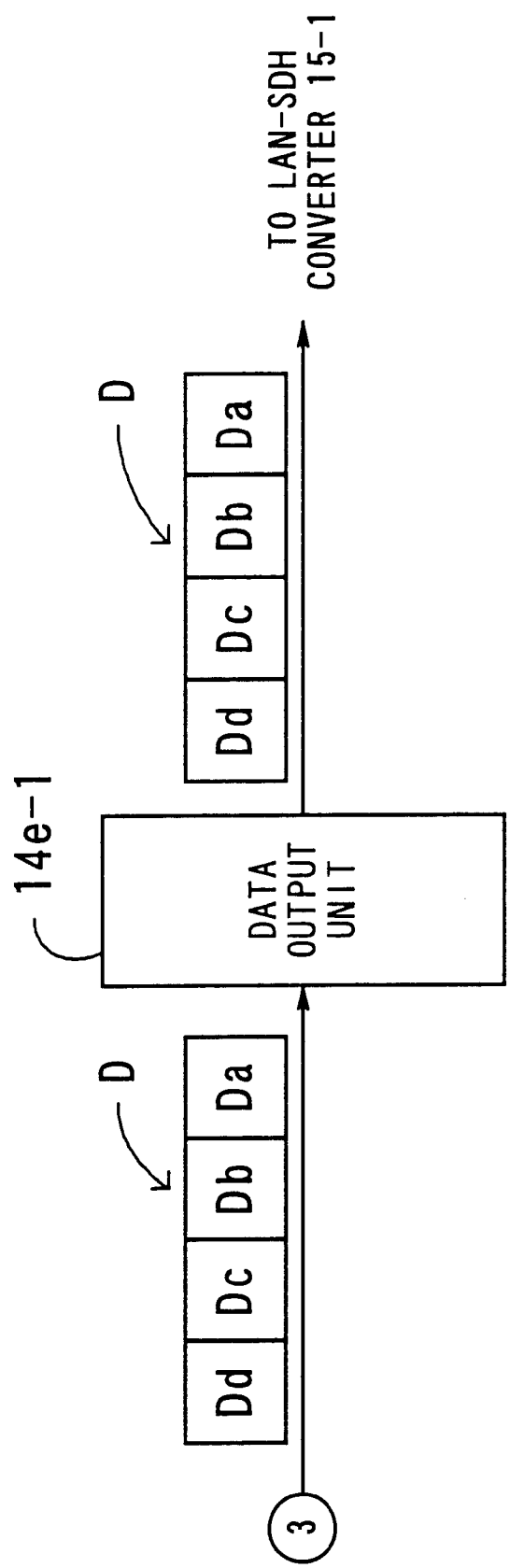

FIGS. 10 and 11 show how the two data streams are processed at the receiving end. The multiplexer/demultiplexer 16 (not shown in FIG. 10) outputs a data stream D2a-1 sent over the working path, together with D2b-1 sent over the protection path. Receive buffers 14c-1 and 14c-2 are employed to buffer those received data streams. Since the two streams may have different delays depending on how they were routed, the receive buffers 14c-1 and 14c-2 compensate for such signal skews by referring to the attached overhead information, thus outputting data blocks in the correct phase alignment. In accordance with the overhead information of each data block, the path aggregation unit 14d reconstructs the original data stream D from the in-phase data streams D2a-1 and D2b-1. The working/protection selector 14e (FIG. 3) in the bandwidth allocation controller 14 now operates as a simple data output unit 14e-1 (FIG. 11) which outputs the data stream D transparently to the LAN-SDH converter 15-1, without switching between working and protection subsystems.

As described above, the proposed internetworking device 10 is designed to deal with increased LAN traffic by temporarily devoting the protection subsystem to data transmission, instead of reserving it for recovery from communication failure. This feature of the present invention permits two distant LAN environments to communicate transparently, without suffering degradation in the network performance.

Although the above examples in FIGS. 7 to 11 have shown how the bandwidth resources are allocated in response to increased traffic, it should be appreciated that the function of the bandwidth allocation controller 14 is not only to raise the allocated bandwidth, but also to dynamically reduce the number of paths, or allocated resources, when it observes decreased traffic. That is, the proposed internetworking device 10 uses bandwidth resources in a more effective way, by dynamically allocating them according to increase or decrease in LAN-to-LAN traffic.

Referring back to FIG. 2, the next section will describe the details of the traffic monitor 12.

According to the present invention, the traffic monitor 12 is designed to detect burst data traffic produced on a LAN, and to this end, it has the following four functions. First, the traffic monitor 12 detects the execution of such an application that is likely to cause long bursty packet traffic. This kind of applications may use, for example, file transfer protocol (FTP) or user datagram protocol (UDP), the latter being a connectionless transport protocol without any guarantee of data delivery. If a command of such data transfer protocols is detected, and if it involves a remote LAN node as a source or destination, the traffic monitor 12 foresees that the LAN-to-LAN data traffic will increase shortly because the command typically causes a long burst of data transmission.

Second, the traffic monitor 12 watches the buffer 15b integrated in the LAN-SDH converter 15-1. It observes how much free space remains in the buffer 15b and at what rate it varies, thereby evaluating the actual LAN-to-LAN data traffic.

Third, the traffic monitor 12 measures the interval between two consecutive data packets transmitted toward a remote end. This monitoring function is based on the observation that packet intervals tend to become shorter as the total traffic increases.

Fourth, the traffic monitor 12 accepts requirements or instructions from network users. That is, the system encourages its users to explicitly declare the use of traffic-intensive applications and/or to specify a necessary bandwidth before running those applications. For this purpose, users are allowed to place a traffic request message on their local network. Such messages received from users will enable the traffic monitor 12 to expect future increase or decrease in LAN-to-LAN data traffic.

The occurrence of burst data streams would cause undesirable traffic congestion, which may lead to slow system responses or errors such as buffer overflow. Suppose here that the LAN-to-LAN traffic has far exceeded its average level. If the excess is of short duration, it would be simply absorbed, or smoothed out, by the buffer 15b, which is employed in the LAN-SDH converter 15-1, and thus all data packets would reach their remote destinations without loss. However, transferring large files, for example, can cause more massive, long-lasting traffic that cannot be managed by the buffer 15b alone, in which case some data could be lost because of buffer overflow. To avoid such data loss problems, the internetworking device 10 has to modify the current bandwidth allocation as promptly as possible to deal with the increased traffic.

Figure 12:
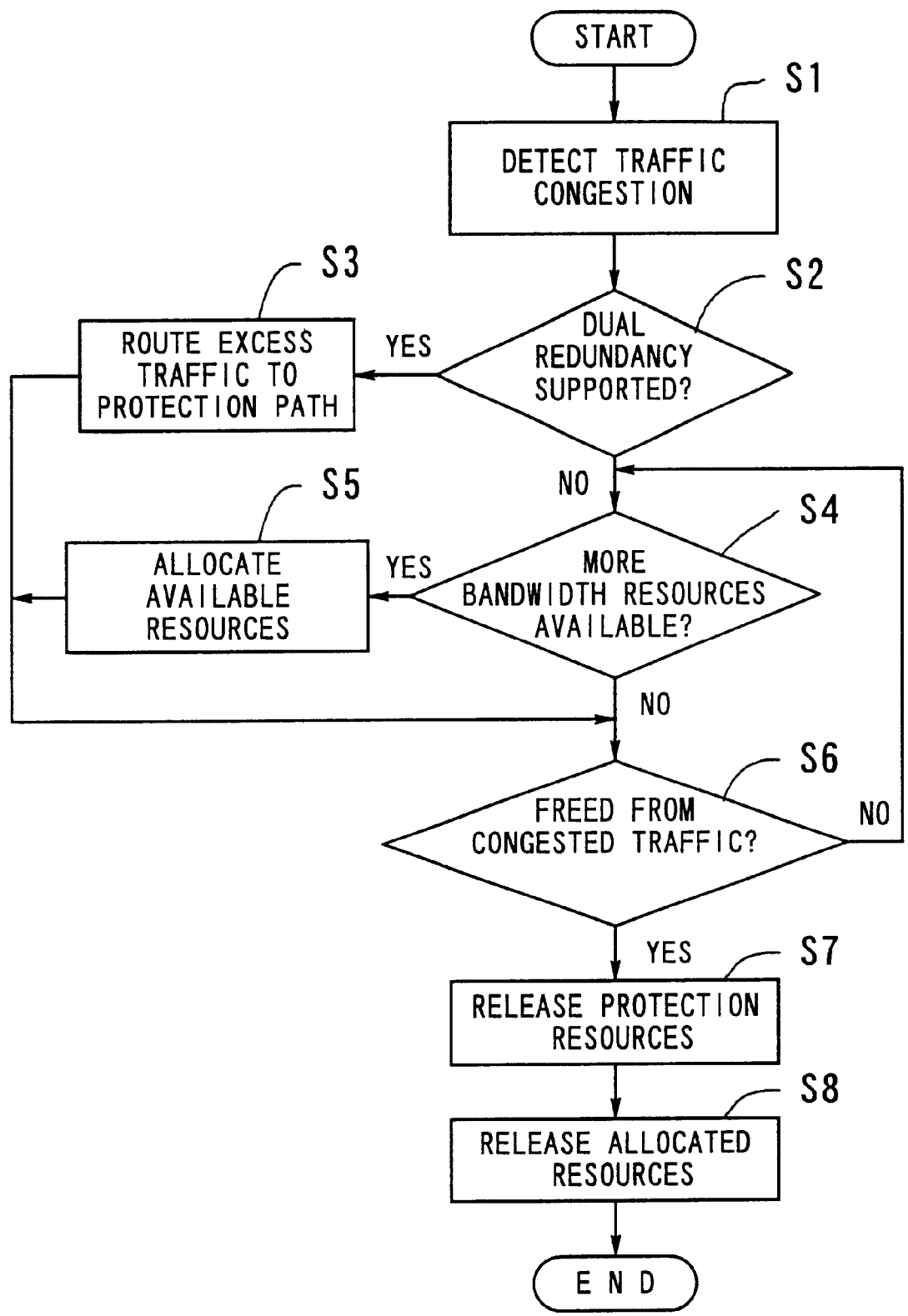
FIG. 12 is a flowchart of a bandwidth allocation process.

Referring now to a flowchart of FIG. 12, a bandwidth allocation process to cope with bursty traffic will be described. This process comprises the following steps.

(S1) The traffic monitor 12 detects (a sign of) traffic congestion.

(S2) When the system supports dual redundant transmission subsystems, the process advances to step S3. Otherwise, it proceeds to step S4.

(S3) The path controller 14-1 attempts to route the excess traffic to a path(s) on the protection transmission subsystem corresponding to that (those) on the working subsystem. The process now proceeds to step S6.

(S4) If there are free bandwidth resources in the working subsystem, the process advances to step S5. Otherwise, the process proceeds to step S6.

(S5) Out of the free bandwidth resources identified at step S4, the path controller 14-1 allocates an appropriate amount of bandwidth to the excess burst traffic.

(S6) If the system has been freed from the congested traffic, the process advances to step S7. If the congestion is still growing, the process returns to step S4 to add more bandwidth resources.

(S7) The path controller 14-1 releases the protection bandwidth resources (if any).

(S8) The path controller 14-1 releases the working bandwidth resources which were added at step S5 (if any).

As can be seen from the above steps, the proposed internetworking device 10 is designed to double the bandwidth by temporarily allocating protection resources (if available) to cope with bursty data traffic. The use of protection resources enables immediate provision of an additional bandwidth to the LAN-to-LAN communication, and thus ensures non-interruptive and reliable communication between remote LAN nodes, without being overwhelmed by congested traffic.

When the shortage of bandwidth cannot be resolved by the use of protection resources alone, the internetworking device 10 searches the bandwidth resource database 13 for more free resources. If such free bandwidth resources are available, the internetworking device 10 at the sending end automatically sends path setting commands to its counterpart at the receiving end to establish additional paths. Because this operation does not need intervention of external control processes, the bandwidth allocation can be updated in a shorter time.

When all data bursts are sent out, and the traffic monitor 12 no longer indicates congestion, the internetworking device 10 releases the extra resources. More specifically, it first releases the protection resources to restore the survivability of the system, and then frees up the added bandwidth on the working transmission subsystem. As a result, the internetworking device 10 returns to the original state in terms of bandwidth allocation.

Figure 13:
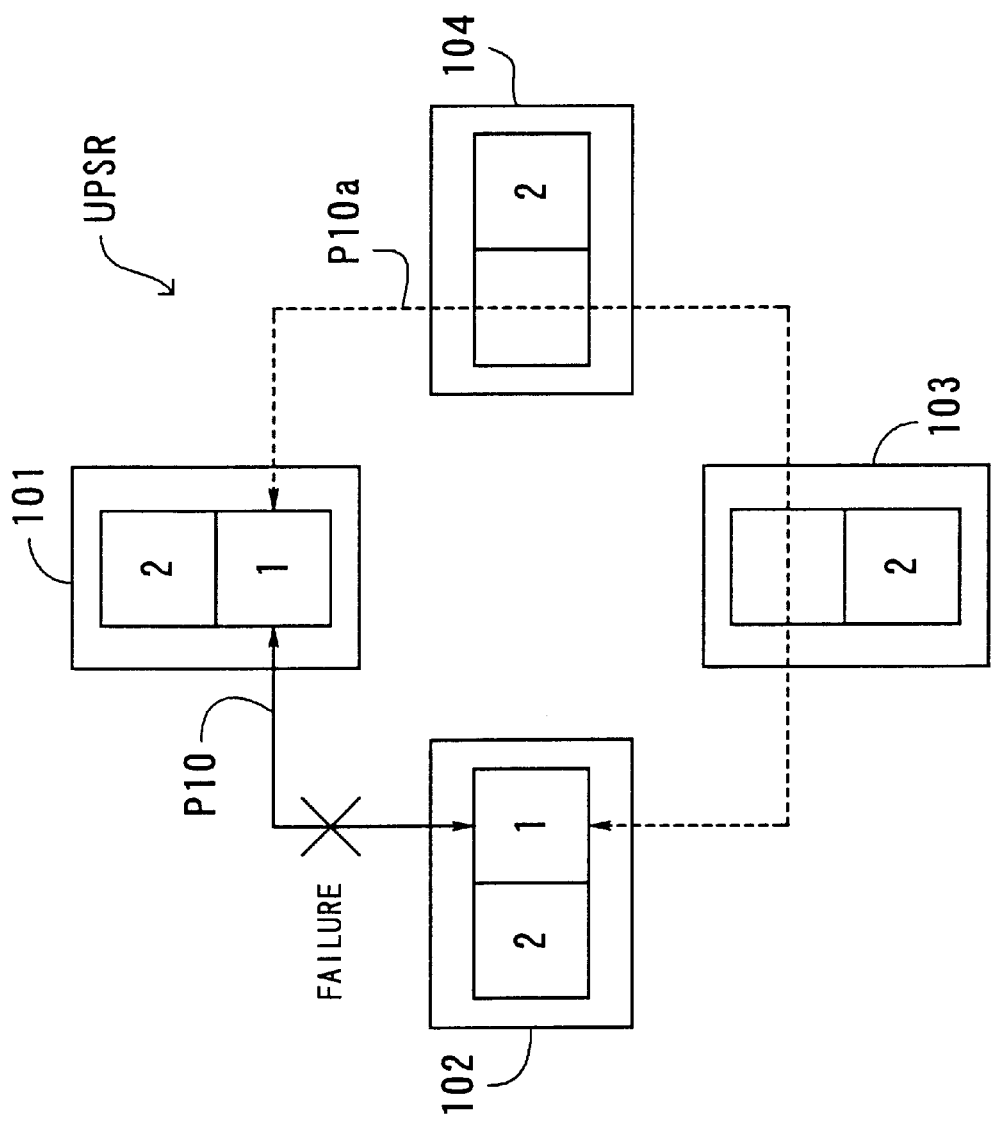
FIG. 13 is a diagram which shows a typical data flow in a UPSR network.
Figure 14:
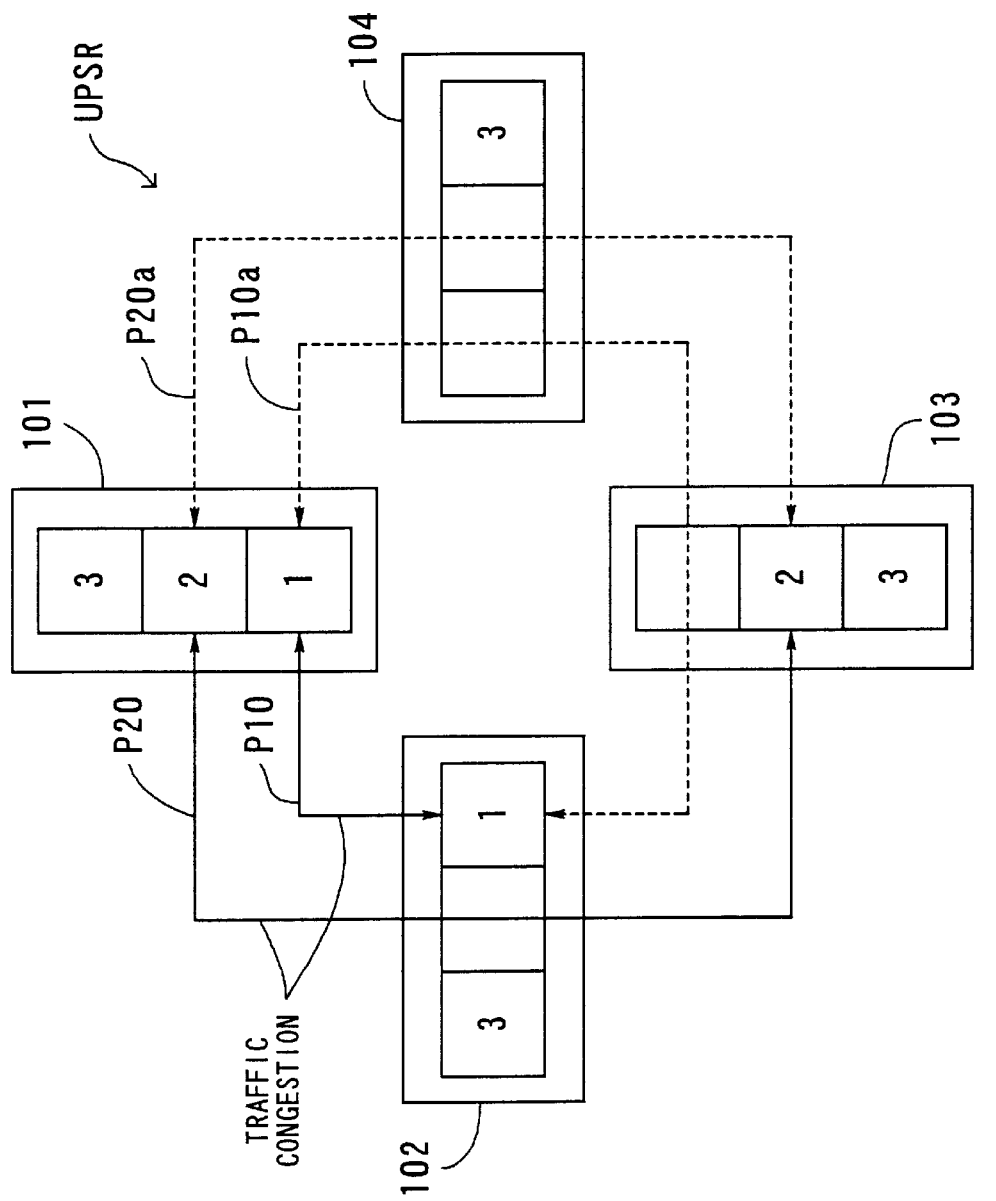
FIG. 14 is a diagram which shows a data flow in a UPSR network employing internetworking devices according to the present invention.

Referring now to FIGS. 13 and 14, the following section will present another embodiment of the present invention in a ring network, as opposed to the point-to-point network having been discussed so far. Typical ring types include a uni-directional path switched ring (UPSR) and a bi-directional line switched ring (BLSR).

FIG. 13 shows a data flow in a typical UPSR network, where four nodes 101 to 104 are linked in a dual concentric ring topology. The UPSR network has a working ring and a protection ring, although FIG. 13 does not show them explicitly. Numerals shown in smaller boxes represent time slot numbers; for simplicity, only two time slots #1 and #2 are illustrated. Suppose here that nodes 101 and 102 have encountered a problem with a path P10 when transferring data by using time slot #1. This UPSR network recovers from the failure by using an alternative path P10a. That is, the nodes 103 and 104 are configured to forward the data in time slot #1 transparently to their subsequent nodes, meaning that they cannot use time slot #1. This eventually creates a dedicated path P10a between the nodes 101 and 102, allowing them to resume communication.

FIG. 14 shows a data flow in a UPSR network according to the present invention, where four nodes 101 to 104 are linked in a dual ring topology and the proposed internetworking device 10 is employed in each node. Numerals shown in smaller boxes represent time slot numbers; for simplicity, only three time slots #1 to #3 are illustrated. Consider, for example, that the nodes 101 and 102 have encountered overwhelming traffic on a path P10 when transferring data using time slot #1. According to the present invention, the UPSR network deals with such excessive traffic by using an alternative path P10a, which is primarily a protection path for P10. Likewise, part of time slot #2 traffic between two nodes 101 and 103 can be temporarily routed to a protection path P20a when the working path P20 is overwhelmed by congestion. In the process of controlling path selection, each node can identify free time slots (e.g., #3 in FIG. 14) by itself. Generally, in the UPSR model, time slots that one node identifies as being free are not used by any other nodes on the same network. Accordingly, it is possible to directly set up a desired path without asking other nodes about free time slots.

As described above, according to the present invention, the nodes in a UPSR network are designed to cope with massive burst data traffic by using protection paths as additional bandwidth resources, which are primarily reserved for survivability of the network. This feature of the present invention permits distant LAN environments to communicate transparently, without suffering degradation in the network performance.

Figure 15:
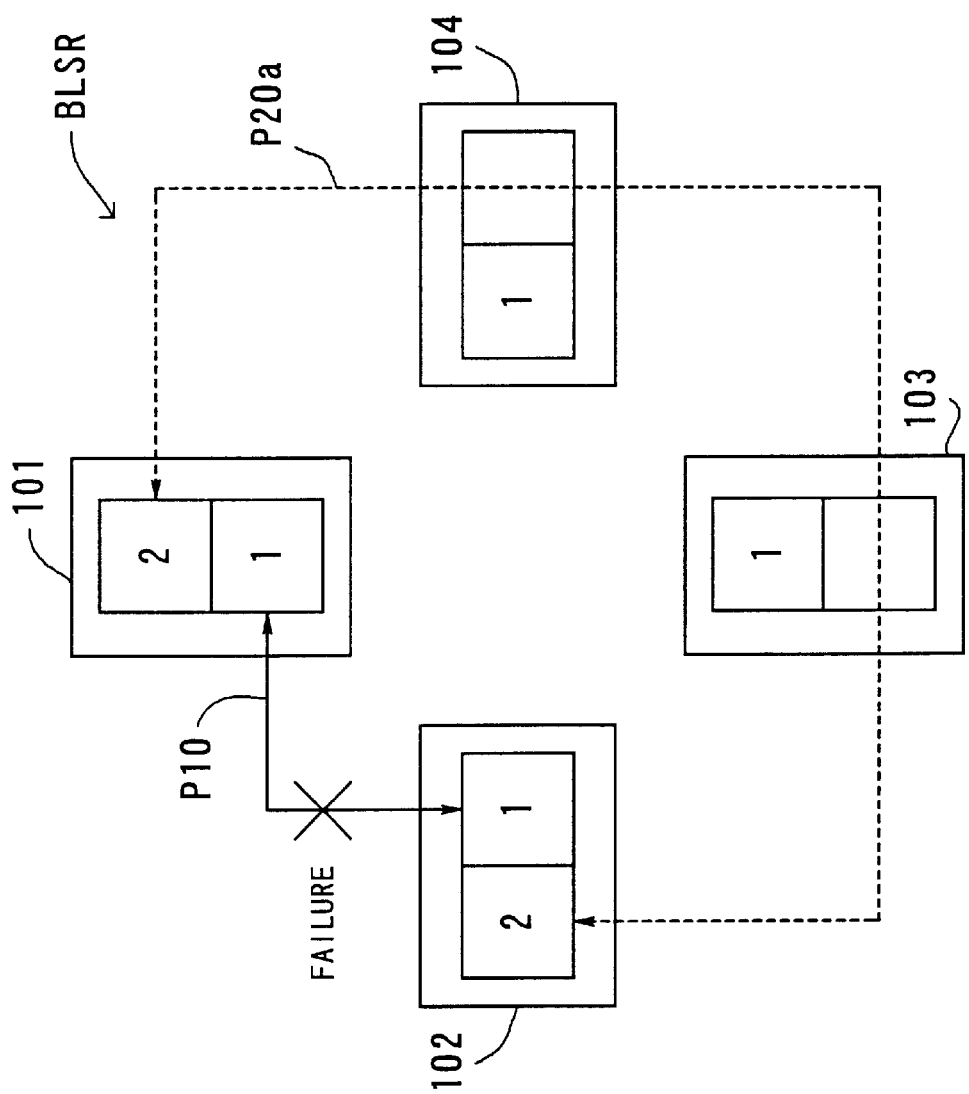
FIG. 15 is a diagram which shows a typical data flow in a BLSR network.

FIG. 15 shows a data flow in a typical BLSR network, where four nodes 101 to 104 are linked in a dual ring topology. This BLSR network actually has two concentric rings running in opposite directions, although FIG. 15 does not show the two rings explicitly. Unlike the UPSR, two rings can be simultaneously used to convey different data traffic, while half the time slots on both rings are reserved for each other's protection channels.

The proposed internetworking device 10 is employed in each node on the network. Numerals shown in smaller boxes represent time slot numbers; for simplicity, only two time slots #1 and #2 are illustrated. Suppose here that the nodes 101 and 102 have encountered a failure with a path P10 when transferring data by using time slot #1. This BLSR network recovers from the failure by using an alternative path P20a shown in FIG. 15. That is, the path P20a is established with a free time slot #2, and the nodes 103 and 104 are configured to transparently forward the data in time slot #2 to their subsequent nodes, meaning that they will not use the time slot #2. As such, the BLSR model reserves a half of its bandwidth resources (e.g., time slot #2 in FIG. 15) for survivability purposes.

Figure 16:
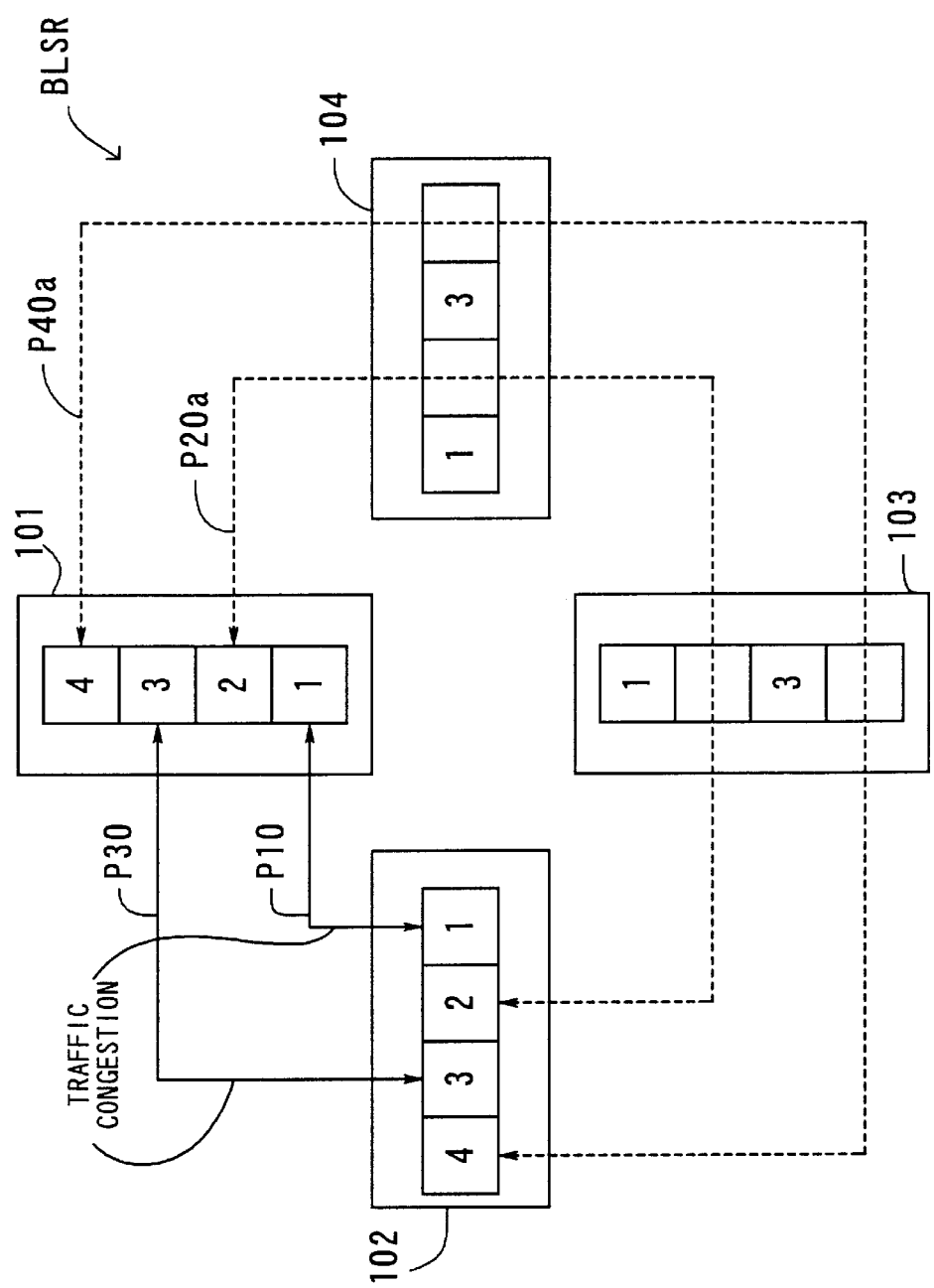
FIG. 16 is a diagram which shows a data flow in a BLSR network employing internetworking devices according to the present invention.

FIG. 16 shows a data flow in a BLSR network according to the present invention. Four nodes 101 to 104 are linked in a ring topology, and the proposed internetworking device 10 is employed in each node. Numerals shown in smaller boxes represent time slot numbers; for simplicity, only four time slots #1 to #4 are illustrated. Here, time slots #2 and #4 are reserved for protection of #1 and #3, respectively.

Suppose, for example, that the nodes 101 and 102 have encountered overwhelming traffic on a path P10 when transferring data by using time slot #1. According to the present invention, the BLSR network deals with the excessive traffic by using its corresponding protection path P20a shown in FIG. 16. Likewise, the traffic on the working path P30 (time slot #3) between two nodes 101 and 102 can be partly routed toward its corresponding protection path P40a to alleviate the congestion.

As described above, according to the present invention, the nodes in a BLSR network are designed to cope with massive data traffic by using protection paths as additional bandwidth resources, which are primarily reserved for survivability of the network. This feature of the present invention permits two distant LAN environments to communicate transparently, without suffering degradation in the network performance.

The present invention further provides a function to allocate bandwidth resources to data traffic related to particular LAN nodes. Typically, large data bursts tend to occur between particular source and destination nodes. For this reason, the traffic monitor 12 may be configured to check and record the destination address (DA) and source address of a burst, each time an additional bandwidth is allocated to it or deallocated from it. The bandwidth allocation controller 14 is then programmed so that it will immediately allocate a specific bandwidth resource (e.g., a protection path) when another burst with the same destination or source address occurs. This feature of the present invention permits the internetworking device 10 to allocate an extra bandwidth to bursty traffic more promptly.

Figure 17:
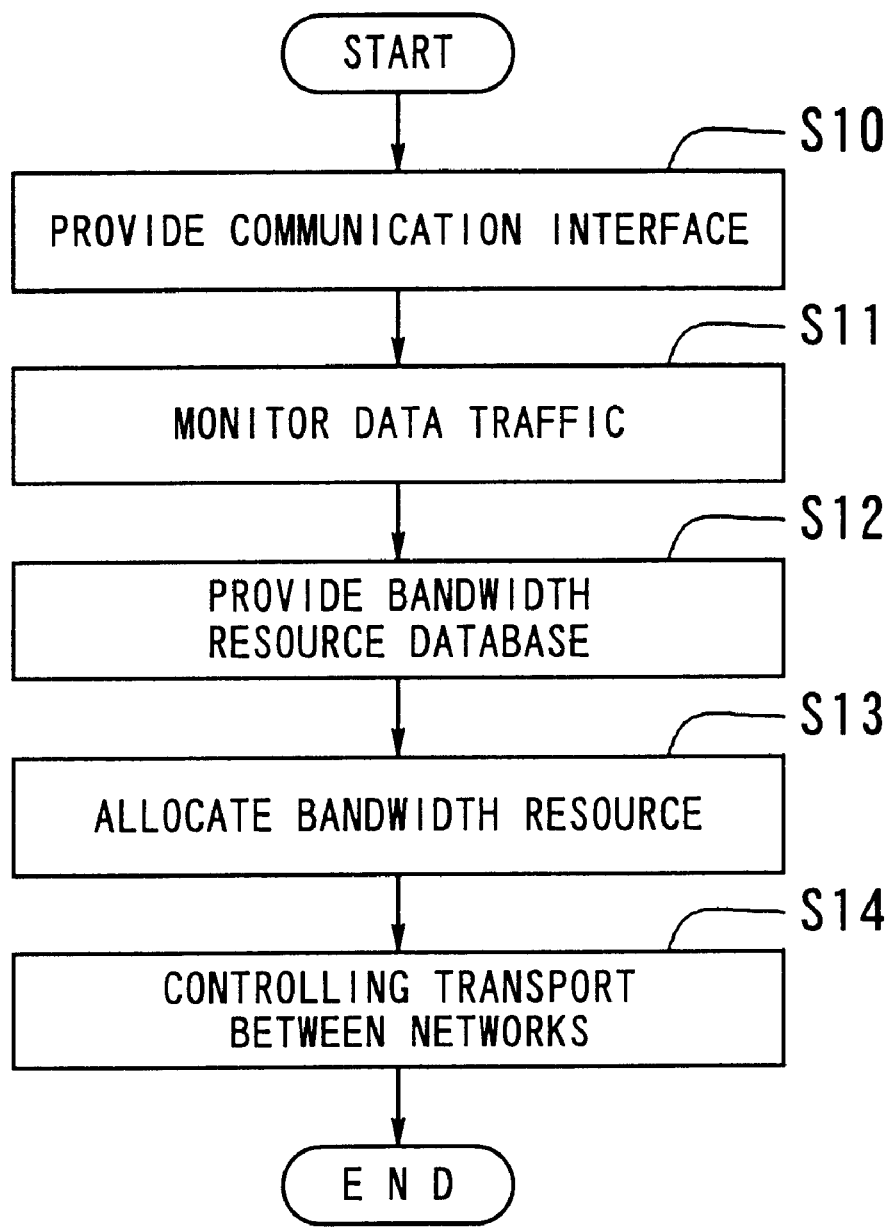
FIG. 17 is a flowchart which shows an internetworking method according to the present invention.

Referring lastly to a flowchart of FIG. 17, an internetworking method according to the present invention will be described below. This process comprises the following steps.

(S10) Providing a communication interface to link with each network.

(S11) Monitoring data traffic between the networks.

(S12) Providing a database storing information on bandwidth resources.

(S13) Dynamically allocating sufficient bandwidth resources to transport data streams over the transport network, based on the data traffic being monitored, as well as consulting the database.

This step S13 may be performed in accordance with parameters supplied by a user. Further, when the transport network has redundant transmission subsystems for survivability purposes, this step S13 may use a protection transmission subsystem as bandwidth resources to be allocated.

(S14) Controlling data transport between the distant networks through the allocated bandwidth resources.

The above description will now be summarized as follows. According to the present invention, the internetworking device and method are designed to dynamically allocate appropriate bandwidth resources for internetworking purposes, based on the data traffic being monitored and also on available bandwidth resources. This feature allows users to enjoy transparent communication with remote parties, without concern for the limitation of an intermediary transport network. Besides making efficient and economical use of available network resources depending on the current traffic need, it offers high-speed interface capabilities, allowing for expected increase in LAN-to-LAN traffic.

The bandwidth in normal conditions can be defined regardless of the bitrate of LAN interface, without wasting bandwidth resources on SDH interface. When bursty traffic is observed, the internetworking device will instantly allocate extra bandwidth to the increased traffic, which avoids slow system responses and resultant errors due to delays in LAN-to-LAN communication. Further, the user can centrally control and maintain the internetworking system in an efficient and convenient manner through a data terminal which is assigned as a management console.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An internetworking device which connects a first network to a second network through a transport network that conforms to SONET or SDH standards, the transport network being assigned a predetermined amount of SONET or SDH path resources, the internetworking device comprising:

network interface means for providing a communication interface to link with the first network;

traffic monitoring means for monitoring data traffic from the first network to the second network;

bandwidth resource information storage means for storing information on path resources of the transport network;

bandwidth allocating means for dynamically increasing bandwidth of the transport network by allocating an additional path to the transport network, consulting said bandwidth resource information storage means, when said traffic monitoring means detects increasing data traffic from the first network; and communication control means for controlling data transport from the first network to the second network using the increased bandwidth of the transport network.

2. The internetworking device according to claim 1, wherein said traffic monitoring means foresees an increase in the data traffic when the first network shows activities of such an application that tends to produce a large amount of network traffic.

3. The internetworking device according to claim 1, wherein said traffic monitoring means monitors the data traffic by watching an occupancy level of a buffer memory temporarily storing the data streams being transported from the first network to the second network.

4. The internetworking device according to claim 1, wherein said traffic monitoring means monitors the data traffic by watching packet intervals of the data streams being transported from the first network to the second network.

5. The internetworking device according to claim 1, wherein said traffic monitoring means receives a traffic request message which specifies a desired bandwidth.

6. The internetworking device according to claim 1, wherein said bandwidth allocating means allocates the additional path according to parameters given by a user of the networks.

7. The internetworking device according to claim 1, wherein said bandwidth allocating means dynamically allocates a combination of additional paths to the transport network when the data traffic is high.

8. The internetworking device according to claim 1, wherein said bandwidth allocating means dynamically reallocates a path with a higher bitrate when the data traffic is high.

9. The internetworking device according to claim 1, wherein:

the transport network provides redundant transmission subsystems including a working subsystem and a protection subsystem; and said bandwidth allocating means allocates paths on the protection subsystem when the data traffic is high.

10. The internetworking device according to claim 1, wherein said bandwidth allocating means allocates a predetermined path resource to the data traffic related to a particular node on the networks.

11. The internetworking device according to claim 1, wherein said bandwidth allocating means dynamically allocates a path on a protection ring to transport the data streams, when the transport network is of Uni-directional Path Switched Ring (UPSR) configuration.

12. The internetworking device according to claim 1, wherein said bandwidth allocating means dynamically allocates a free time slot as a bandwidth resource to transport the data streams, when the transport network is of Bi-directional Line Switched Ring (BLSR) configuration.

13. The internetworking device according to claim 1, further comprising phase compensation means for correcting alignment of the data streams by compensating for phase variations caused by traveling over different paths.

14. An internetworking method to connect a first network to a second network through a transport network that conforms to SONET or SDH standards, the transport network being assigned a predetermined amount of SONET or SDH path resources, the method comprising the steps of:

(a) providing a communication interface to link with the first network;

(b) monitoring data traffic from the first network to the second network;

(c) providing a database storing information on path resources of the transport network;

(d) dynamically increasing bandwidth of the transport network by allocating an additional path to the transport network, consulting the database of path resource information, when increasing data traffic from the first network is detected; and (e) controlling data transport from the first network to the second network using the increased bandwidth of the transport network.

15. The internetworking method according to claim 14, wherein said step (d) of bandwidth allocation dynamically allocates the additional path according to parameters given by a user of the networks.

16. The internetworking method according to claim 14, wherein said step (d) of bandwidth allocation uses a protection subsystem as an additional path a resource to be allocated, when the transport network provides redundant transmission subsystems.

* * * * *